H. C. ANDERSON.
GATE.
APPLICATION FILED SEPT. 7, 1911.
1,030,222.
Patented June 18, 1912.
2 SHEETS—SHEET 1.
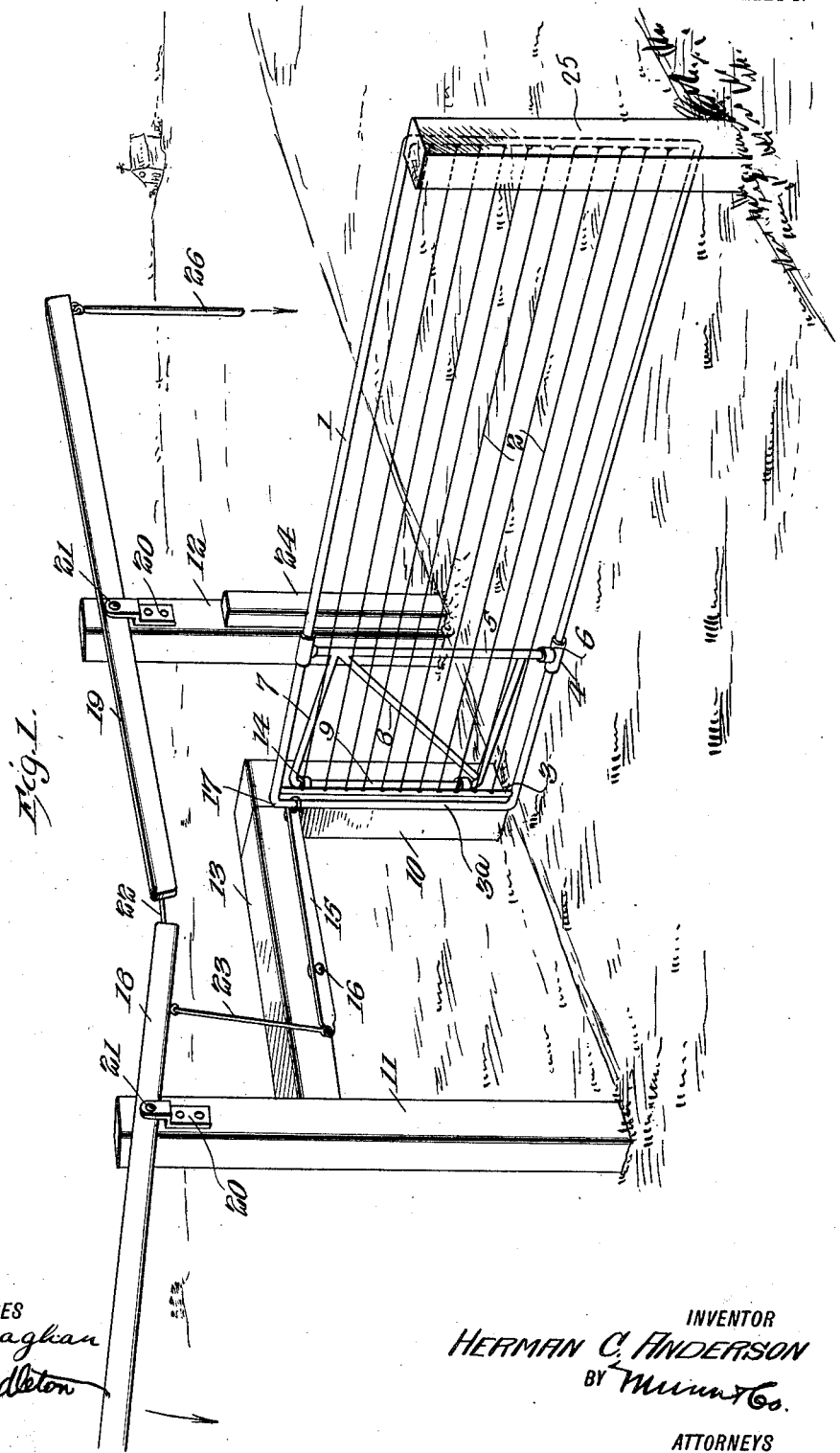
WITNESSES
INVENTOR
HERMAN C. ANDERSON
BY
ATTORNEYS

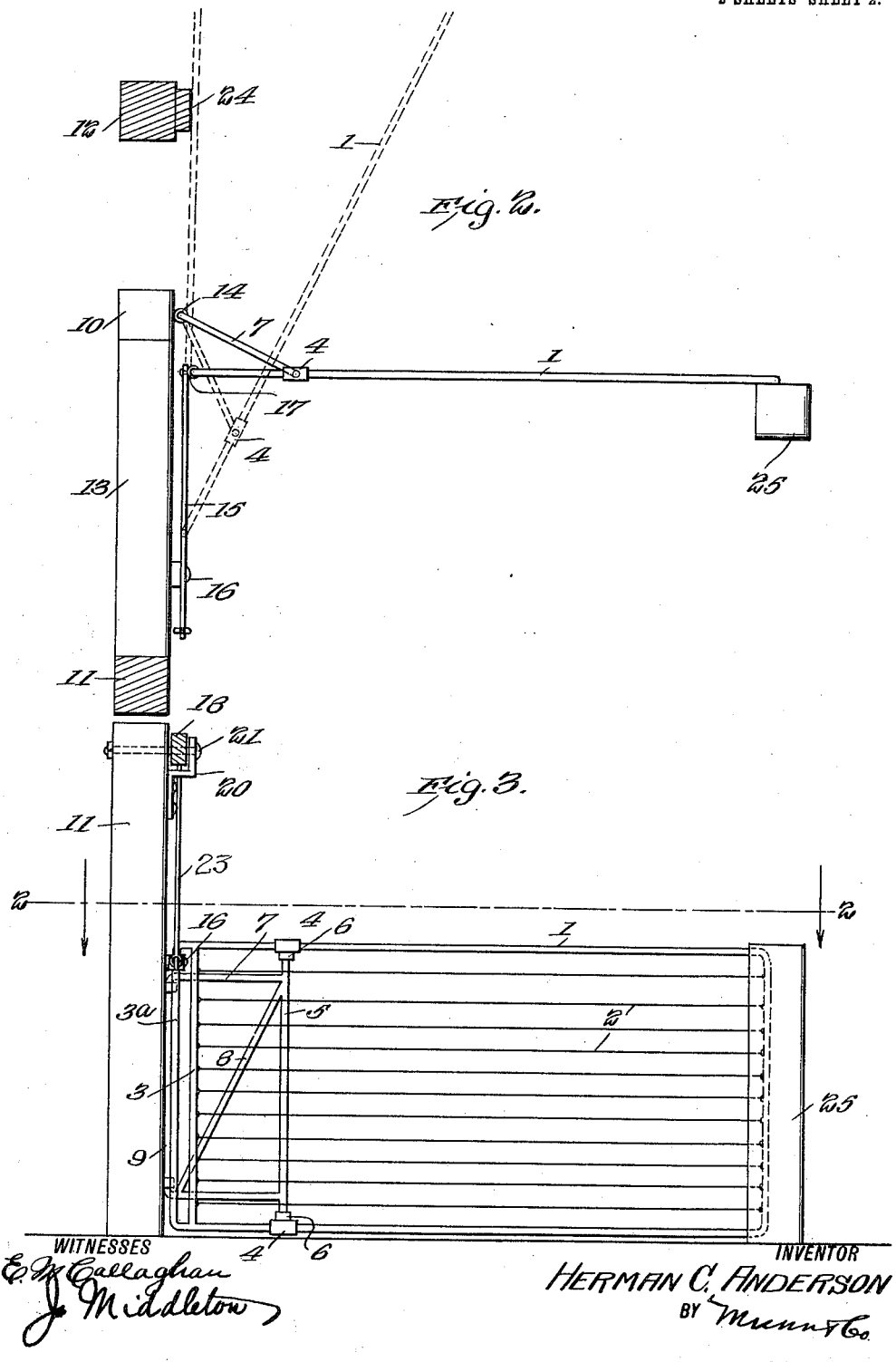

UNITED STATES PATENT OFFICE.

HERMAN CARL ANDERSON, OF MOUNT VERNON, WASHINGTON.

GATE.

1,030,222.      Specification of Letters Patent.      Patented June 18, 1912.

Application filed September 7, 1911. Serial No. 648,029.

*To all whom it may concern:*

Be it known that I, HERMAN CARL ANDERSON, a citizen of the United States, and a resident of Mount Vernon, in the county of Skagit, State of Washington, have invented a new and useful Improvement in Gates, of which the following is a specification.

My invention is an improvement in gates, and has for its object the provision of a single and cheaply constructed device of the character specified, having means whereby it may be opened by persons on horseback or in vehicles without descending from the horse or vehicle.

In the drawings: Figure 1 is a perspective view of the improvement with the gate closed; Fig. 2 is a section on the line 2—2 of Fig. 3; and Fig. 3 is a front view of the gate.

The gate proper may be of any usual or desired construction, that shown comprising an open frame 1 having the end members thereof connected at spaced intervals by cross wires 2. At the hinged or connected end of the gate the frame is provided with a transverse bar 3 parallel with the adjacent and bar 3$^a$ and spaced apart therefrom. Near the said bar 3 each of the top and bottom members of the frame has thereon a sleeve 4, and the sleeves are connected by a bar 5 substantially parallel with the end of the frame. Each sleeve is provided with a lateral nipple or bearing 6 and the bar 5 is rotatable in the bearings.

An arm 7 extends laterally from the bar near each end thereof, and a brace 8 is arranged between the inner end of the upper arm and the outer end of the lower arm. The arms 7 are of such length that when lying alongside the gate the free ends of the arms extend beyond the adjacent end of the gate and the arms are connected by an integral bar 9.

The post 10 of the gate is of suitable size and character, and posts 11 and 12 are arranged on the opposite sides of the post 10. The posts 11 and 12 are of greater height than post 10, and post 11 is connected to the top of post 10 by a horizontal beam 13, arranged between posts 10 and 11 and with its ends abutting the said posts.

The bar 9 is connected to the post 10 near each end by means of a hinge 14, and a lever 15 is pivoted intermediate its ends at 16 to the beam 13, and one end of the lever is connected to the end bar 3$^a$ of the gate frame by means of an eye bolt or swivel eye 17, journaled in the lever, and encircling the end bar 3$^a$.

Operating levers 18 and 19 are pivoted to the posts 11 and 12, the lever 18 being connected to the former post and the lever 19 to the latter. Each lever is pivoted between the adjacent post and a bracket arm 20 secured to the post by means of a pin 21, and the inner ends of the levers are connected by a link 22. The inner end of the lever 18 is connected to the outer end of lever 15 by means of a link 23, and the levers 18 and 19 extend in opposite directions from the gate. Each lever 18 or 19 is used to open the gate by persons traveling toward the gate from that side and to close the gate by those traveling in the opposite direction.

The gate opens against the post 12, and a buffer bar 24 is secured to that face of the post toward which the gate swings.

A post 25 is provided for engagement by the gate when in closed position.

The operation of the gate is as follows: When, for instance, the traveler approaches on the side of post 11, he grasps the handle 26 depending from the outer end of the lever in position to be grasped, and swings the outer end of the lever downward. The lever 15 is swung on its pivot 16, and the swivel eye 17 which is slidable on the bar 3$^a$ and pivotally connected with the lever, is slid downward toward the lower end of the bar 3$^a$. The bar 3$^a$ is also drawn toward the post 11, and the gate swings on the arms 7 into the successive positions indicated in dotted lines in Fig. 2 until the face of the gate engages the buffer bar 24. The traveler passes through the gate until he reaches the outer end of lever 19, where he grasps the handle 26 thereof and pulls the outer end of the lever downwardly to close the gate. The end of the lever 15 describes a semi-circle, each time that the gate is opened and closed. The gate holds its open or closed position until the operating mechanism is set in motion. The lever 15 practically locks the gate open or closed. It will be noticed that the construction is extremely simple, so that there is but little liability of the gate getting out of order. The bar 3$^a$ is spaced from the bar 3 to permit the swivel eye 17 to slide thereon, and the wires 2 are connected with the bar 3. The rod or bar 5, arms 7 and bar 9 constitute an auxiliary frame pivoted at one side to the gate near one end, and to a fixed support at the opposite side.

I claim:

1. In combination with the post, a gate, a rod arranged vertically near one end of the gate and pivoted at each end to the gate, arms extending laterally from the rod and hinged to the post, a sleeve slidable on the end of the gate adjacent to the rod, a lever pivoted intermediate its ends adjacent to the gate and having one end pivoted to the sleeve, said lever being substantially horizontal when the gate is closed, a post at each side of the gate post, an operating lever pivoted intermediate its ends to each post, a connection between the inner ends of the operating levers, and a link connecting the inner end of one operating lever to the other end of the first named lever.

2. In combination with the post, a gate, a rod arranged vertically near one end of the gate and pivoted at each end to the gate, arms extending laterally from the rod and hinged to the post, a sleeve slidable on the end of the gate adjacent to the rod, a lever pivoted intermediate its ends adjacent to the gate and having one end pivoted to the sleeve, said lever being substantially horizontal when the gate is closed, and means connected with the other end of the lever for swinging the same to open the gate.

3. In combination, a gate, a rod arranged transversely of the gate intermediate its ends, a pivotal connection between the gate and the rod, arms extending laterally from the rod, a support to which the free ends of the arms are hinged, a lever pivoted intermediate its ends near the gate, a slidable connection between one end of the lever and one end of the gate, an operating lever pivoted intermediate its ends on each side of the gate, and a connection between the inner end of each operating lever and the gate.

4. In combination, a gate, a rod pivoted transversely of the gate near one end, an arm extending laterally from the rod near each end thereof, a fixed support to which the arms are hinged, a normally horizontal lever pivoted intermediate its ends near the gate, a slidable connection between one end of the lever and the end of the gate adjacent to the rod, and means engaging the other end of the lever for swinging the same to open and close the gate.

5. In combination, a gate, a rod pivoted transversely of the gate near one end, an arm extending laterally from the rod near each end thereof, a fixed support to which the arms are hinged, a lever pivoted intermediate its ends near the gate, a slidable connection between one end of the lever and the end of the gate adjacent to the rod, and means engaging the other end of the lever for swinging the same to open and close the gate.

6. In combination, a gate, a frame having one side pivoted to a fixed support and the other side pivoted transversely of the gate intermediate its ends, a lever pivoted intermediate its ends near the gate and having one end slidably connected with one end of the gate, and oppositely arranged operating levers connected with the other end of the lever for swinging the same to open and close the gate.

7. In combination, a gate, a frame having one side pivoted to a fixed support and the other side pivoted transversely of the gate intermediate its ends, a lever pivoted intermediate its ends near the gate and having one end slidably connected with one end of the gate, and means connected with the other end of the lever for swinging said lever to open and close the gate.

8. In combination, a gate, a frame having one side pivoted to a fixed support and the other side pivoted transversely of the gate intermediate its ends, and means connected with the other end of the gate for swinging said gate on the frame.

HERMAN CARL ANDERSON.

Witnesses:
W. L. BRICKER,
WM. HAYTON.

Copies of this patent may be obtained for five cents each, by addressing the "Commissioner of Patents, Washington, D. C."